US007660258B2

(12) United States Patent
Cho et al.

(10) Patent No.: US 7,660,258 B2
(45) Date of Patent: Feb. 9, 2010

(54) METHOD FOR AUTOMATICALLY CONFIGURING NETWORK ADDRESSES IN MOBILE MULTI-HOP NETWORK

(75) Inventors: Song-yean Cho, Seoul (KR); Byung-in Mun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 764 days.

(21) Appl. No.: 10/921,958

(22) Filed: Aug. 20, 2004

(65) Prior Publication Data

US 2005/0041598 A1 Feb. 24, 2005

(30) Foreign Application Priority Data

Aug. 20, 2003 (KR) ........................ 10-2003-0057685

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ........................ 370/252; 37/400; 37/338; 37/339

(58) Field of Classification Search ................. 370/252, 370/338, 349, 466; 455/435, 432; 709/239, 709/242

See application file for complete search history.

(56) References Cited

U.S. PATENT DOCUMENTS

| 5,574,860 | A | * | 11/1996 | Perlman et al. | ............. 709/220 |
| 6,044,062 | A | * | 3/2000 | Brownrigg et al. | ......... 370/238 |
| 6,172,986 | B1 | * | 1/2001 | Watanuki et al. | ............ 370/466 |
| 6,845,091 | B2 | * | 1/2005 | Ogier et al. | ................ 370/338 |
| 2002/0018448 | A1 | | 2/2002 | Amis et al. | |
| 2002/0039357 | A1 | | 4/2002 | Lipasti et al. | |
| 2002/0098840 | A1 | * | 7/2002 | Hanson et al. | .............. 455/435 |

FOREIGN PATENT DOCUMENTS

| JP | 11-55318 A | 2/1999 |
| KR | 2002-0082471 A | 10/2002 |

* cited by examiner

*Primary Examiner*—Ricky Ngo
*Assistant Examiner*—David Oveissi
(74) *Attorney, Agent, or Firm*—Sughrue Mion, PLLC

(57) ABSTRACT

The present invention relates to a method for automatically configuring network addresses of mobile nodes participating in a mobile multi-hop network. The method of the present invention includes a first step of, if a first mobile node belonging to a first network moves into and participates in a second network, detecting that the first mobile node has moved; a second step of securing a route from the first mobile node to a gateway of the second network and requesting network configuration information; and a third step of receiving an available network address allocated by the gateway and changing the network configuration information of the first mobile node.

19 Claims, 17 Drawing Sheets

FIG. 5D

Neighbor Table Node 5 (Network ID : B)

| NW addr | Hw addr | NW ID |
|---|---|---|
| 4 | 0xff34a5c8941b | B |
| 1 | 0xff34a5c8941b | A |

Newly added row →

FIG. 7B

| Neighbor Address | Mac Address | Network ID |
|---|---|---|
| 1 | 0xff34a5c8941b | A |

FIG. 7C

| Neighbor Address | Mac Address | Network ID |
|---|---|---|
| 3 | 0xff34a5c8941b | B |
| 5 | 0xff35c84cs941 | B |

METHOD FOR AUTOMATICALLY CONFIGURING NETWORK ADDRESSES IN MOBILE MULTI-HOP NETWORK

BACKGROUND OF THE INVENTION

This application claims the priority of Korean Patent Application No. 10-2003-0057685 filed on Aug. 20, 2003, in the Korean Intellectual Property Office, the disclosure of which is incorporated herein in its entirety by reference.

1. Field of the Invention

Apparatuses and methods consistent with the present invention relate to configuring addresses of mobile nodes present in a mobile network, and more particularly, to automatically configuring network addresses of mobile nodes participating in a mobile multi-hop network.

2. Description of the Related Art

A mobile ad hoc network provides a service to enable multi-hop based communications by connecting mobile terminals to one another by means of wireless links. Systems employing conventional wireless LAN based networks are constructed by connecting wired links to wireless links via access points. In such systems, since the coverage of the wireless links is not beyond the coverage within which the wireless links are directly connected to the access points, the access points can directly communicate with and control all terminal nodes. That is, mobile nodes can find access points and gain access to the Internet through connection with the found access points. In addition, a problem relating to allocation of an address system suitable to a current network, and the like can be overcome through direct communications among respective nodes.

However, in a mobile ad hoc network in which connection to access points is made using multi-hops to overcome limitations on the coverage of conventional networks, the access points cannot communicate directly with all terminal nodes. Under these circumstances, in order that each terminal node finds an access point and is allocated a network address from the access point for efficient access to the Internet, there is a need for a new mechanism that does not assume direct communication with access points.

In other words, when an access point for connection with the Internet is connected to an ad hoc based network, a mobile node has to be able to detect its own movement and find the access point, which relays the connection with the Internet, with a minimum network overload. In addition, the process of allocating the mobile node a network address by the access point and connecting the mobile node with the Internet using the allocated network address should be automatically and efficiently performed.

A conventional technique for performing such a process is shown in FIG. 1. In a conventional Bluetooth or wireless LAN based network, an access point (AP) 110 is connected to mobile nodes 111, 112 and 113, which are managed by the access point 110, within one hop. In order that the mobile nodes 111, 112 and 113 connected to the access point 100 via wireless links may be connected with the Internet 100, they utilize the access point 100 connected with the Internet using a wired or wireless link.

In such a configuration of a conventional network, all mobile terminal nodes can communicate directly with an access point. As for conventional techniques relating to such a configuration, International Publication Nos. WO 00/176154, WO 01/37497 and WO 02/23342 disclose unicast routing for an ad hoc network itself.

In the conventional technique shown in FIG. 1, since all the mobile terminal nodes 111, 112 and 113 can communicate directly with the access point 110, the access point can easily detect a mobile node 120 newly connected to the access point 110. If the new mobile node 120 is detected, this means that the mobile node 120 has moved. Then, the access point 110 confirms, based on a MAC address, whether the mobile node 120 belongs to a network under current management, and the access point 110 then relays connection of the mobile node 120 with the Internet 100. At this time, due to differences between address systems, there may occur a case where a new IP address should be configured for the mobile node 120. In this case, a user manually configures a new IP address in a network using a static IP, whereas the mobile node 120 is allocated a new IP address via a dynamic host configuration protocol (DHCP) in a network using a dynamic IP.

In the conventional technique, as shown in FIG. 1, it is assumed that the mobile terminal nodes 111, 112 and 113 and the access point 110 are connected directly to each other within one hop of the access point and a newly moved mobile terminal node also enters within one hop of the access point. In this case, the moved node can easily detect that there is a change in an access point responsible for its connection with the Internet. Further, since the moved node is located at the distance of one hop from a new access point, it is not necessary to find a route reaching the new access point for connection with the Internet. Moreover, as for the confirmation of an IP address, the user can manually allocate an IP address to the moved node, or the moved node can be easily allocated a new IP address using DHCP.

As described above, since the access point is connected, within only one hop, to all the mobile nodes managed by the access point in the conventional wireless LAN based network, the mobile nodes can efficiently find an access point for connection with the Internet and then be easily connected to the access point. In addition, problems relating to the allocation of an address system suitable for a current network, and the like can be easily solved.

However, in a mobile ad hoc network environment where mobile nodes are connected to one another through mobile multi-hops, only some of the mobile nodes can communicate directly with an access point within one hop and there are many cases where a new mobile node that has entered the network is not within one hop of the access point. Accordingly, when a mobile node has moved, it is difficult to detect that the connection of the mobile node to the access point for connection with the Internet has been changed. Further, there is a problem in that a route reaching a new access point should be found.

In addition, during the process of confirming an IP address, a mobile node that cannot communicate directly with an access point should receive an acknowledgement message through multi-hops of the ad hoc scheme. Accordingly, since the mobile node cannot use its own IP address until the use of the IP address is acknowledged by the access point, there is a problem in that it is difficult for the mobile node to transmit a message to the access point and receive a message from the access point.

As described above, in the mobile add hoc environment where mobile terminal nodes are connected to one another through mobile multi-hops, an access point cannot communicate directly with all the mobile terminal nodes. Therefore, when a mobile node moves, the whole processes by which the moved mobile node finds a route to an access point for connection with the Internet, confirms an address suitable for an address system of the access point and the mobile node is actually connected with the Internet through multi-hops.

Under the conditions where there is no topology information on a route and a destination, communications through multi-hops causes an increase in the number of broadcasts, resulting in the reduction in the overall efficiency of a network.

SUMMARY OF THE INVENTION

The present invention is conceived to solve the aforementioned problems. An aspect of the present invention is to provide a method for enabling a mobile multi-hop based mobile node to detect its own movement.

Another aspect of the present invention is to provide a method for enabling a mobile multi-hop based mobile node to find an access point with minimum network overload so that the mobile node can be efficiently connected with the Internet.

A further aspect of the present invention is to provide a method for automatically and efficiently configuring the processes of enabling a mobile multi-hop based mobile node to be subjected to confirmation of a network address by an access point and to be actually connected with the Internet using the network address.

According to one aspect of the present invention for achieving the aspects, there is provided a method for automatically configuring a network address of a first mobile node newly participating in a mobile multi-hop network, comprising a first step of, if the first mobile node belonging to a first network moves into and participates in a second network, detecting that the first mobile node has moved; a second step of securing a route from the first mobile node to a gateway of the second network and requesting network configuration information; and a third step of receiving an available network address allocated by the gateway and changing the network configuration information of the first mobile node.

According to another aspect of the present invention, there is provided a first mobile node newly participating in a mobile multi-hop network and receiving an allocated network address, comprising a first means for detecting that the first mobile node has moved, when the first mobile node belonging to a first network moves into and participates in a second network; a second means for securing a route from the first mobile node to a gateway of the second network and requesting network configuration information; and a third means for receiving an available network address allocated by the gateway and changing the network configuration information of the first mobile node.

BRIEF DESCRIPTION OF THE DRAWINGS

The above and other aspects, features and advantages of the present invention will become apparent from the following description of exemplary embodiments given in conjunction with the accompanying drawings, in which:

FIG. 5D is a view showing the contents of a Neighbor table of node 5 that are updated through the hello messages in FIG. 5A;

FIG. 7B is a view showing the contents of a Gateway_Solicit_Cache table possessed by nodes 3 and 5 in FIG. 7A;

FIG. 7C is a view showing the contents of a Gateway_Solicit_Cache table possessed by node 1 in FIG. 7A;

DETAILED DESCRIPTION OF THE INVENTION

Hereinafter, exemplary embodiments of the present invention will be described in detail with reference to the accompanying drawings.

Figure 1:
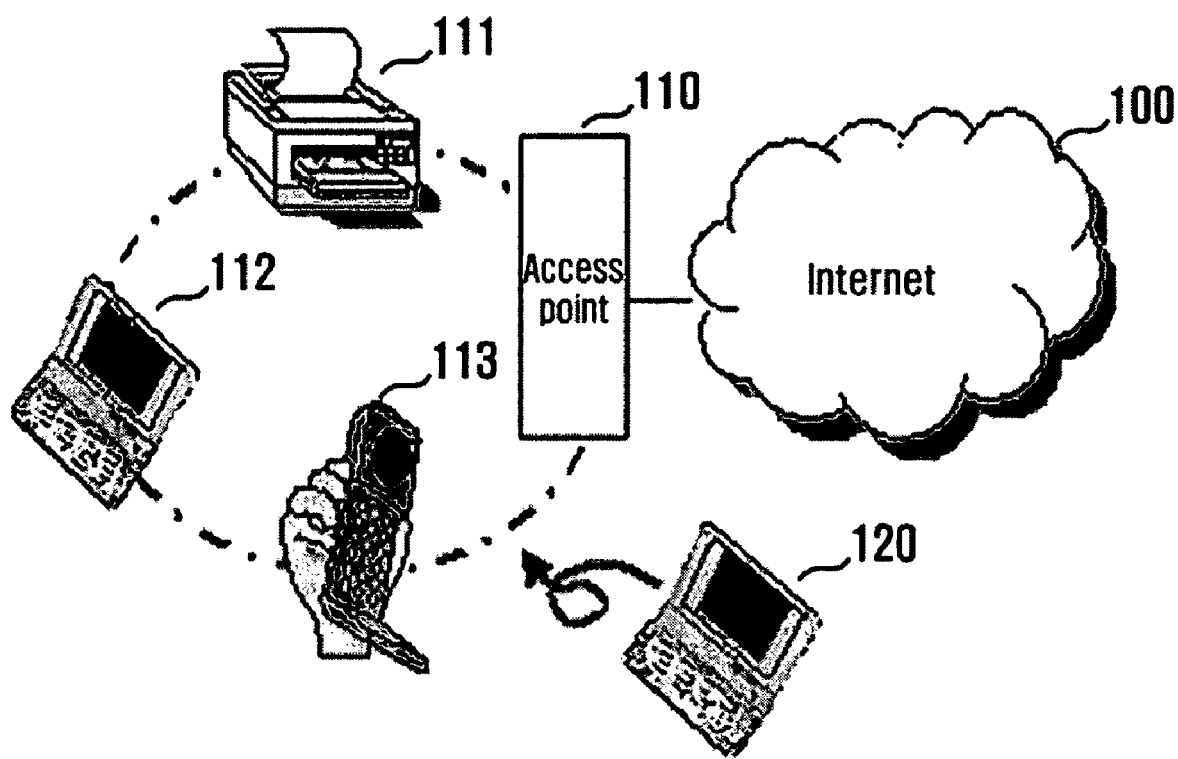
FIG. 1 is a view showing a case where a mobile node moves into a network using an access point in the related art.
Figure 2:
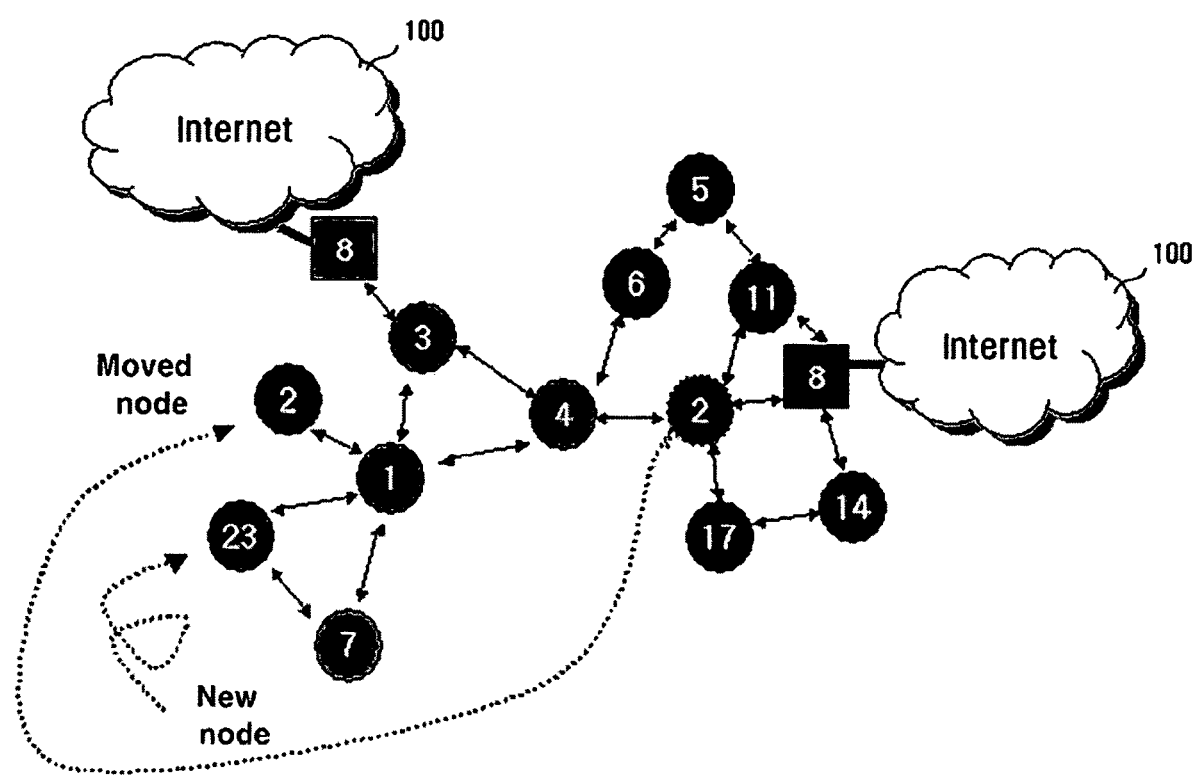
FIG. 2 is a view showing an example where a mobile node moves into and participates in a new network.

As shown in FIG. 2, in a mobile network environment, mobile nodes can randomly move to withdraw from an existing network or participate in a new network. Further, a new mobile node that does not belong to any networks can be generated and included in a specific network. As shown in FIG. 2, in any mobile networks, there exist nodes that can be connected to an access point within one hop to communicate directly with the access point and to gain access to the external Internet. Furthermore, there exist nodes that cannot communicate directly with the access point because the nodes are at a distance of two or more hops from the access point, but can communicate indirectly with the access point using nodes connected to the access point within one hop. In the embodiments to be described below, it is assumed that the access point simultaneously has the function of a gateway for connection with the external Internet.

That is, any network is considered a combination of an infrastructure system comprising nodes directly connected to an access point and an ad hoc system in which nodes communicate with one another in one-to-one correspondence regardless of an access point. When nodes moving from other networks into or newly added to a new network are not connected directly to an access point, the nodes should find a route to the access point serving as a gateway for access to the external Internet and secure an address to be used in the new network.

Figure 3:
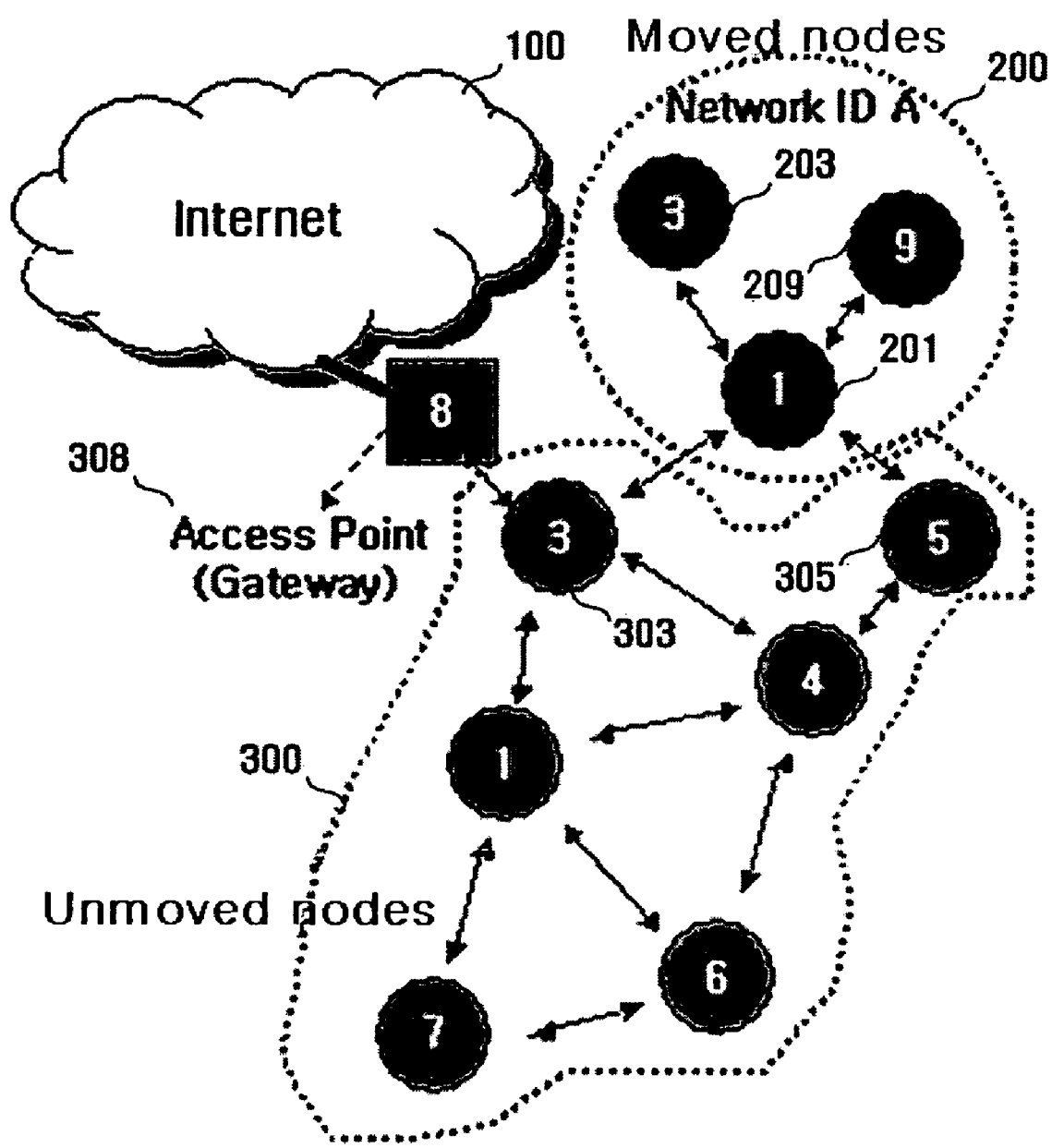
FIG. 3 is a view showing an example where a mobile network comprising mobile nodes moves into and participates in a new network.

In addition to a case where individual nodes move into and participate in a new network as shown in FIG. 2, there may occur a case where all or a part of an ad hoc based network moves into and participates in an existing network as shown in FIG. 3. When two networks are combined with each other in such a manner, newly participating nodes should be identified and managed as new members of the existing network. Accordingly, since the nodes newly participating in the network are required to be distinguished from existing nodes in the network, network IDs enabling identification of networks are allocated to respective nodes in accordance with the present invention.

As shown in FIG. 3, node 1 201, node 3 203 and node 9 209 with a network ID of A move and are connected to node 3 303 and node 5 305 with a network ID of B. At this time, the nodes with the network ID of A should be able to communicate with node 8 308, i.e., an access point, through the nodes with the network ID of B in order to connect with the Internet. To this end, node 1 201, node 3 203 and node 9 209 with the network ID of A should find a route to node 8 308 with the network ID of B, receive network addresses and information on network configuration related thereto that can be used in the network B, and configure their own network information according to the received network addresses and information.

In such a process, there may occur a case where network addresses of nodes present in different networks may conflict with one another and thus the nodes cannot be used during such a process. Therefore, in order to send information to a node newly participating in the network, support of a neighbor node is required. That is, node 1 201 with the network ID of A can transmit and receive messages to and from the network B by means of support of node 3 303 or node 5 305 with the network ID of B, and node 3 303 and node 5 305 with the network ID of B can transmit and receive messages to and from the network A by means of support of node 1 201 with the network ID of A.

FIGS. 4A to 4G show the structures of cache information tables possessed by each node and the structures of message packets to be transmitted/received between nodes, according to the present invention. Each of the tables and packets commonly includes network ID information proposed by the present invention.

Figure 4A:
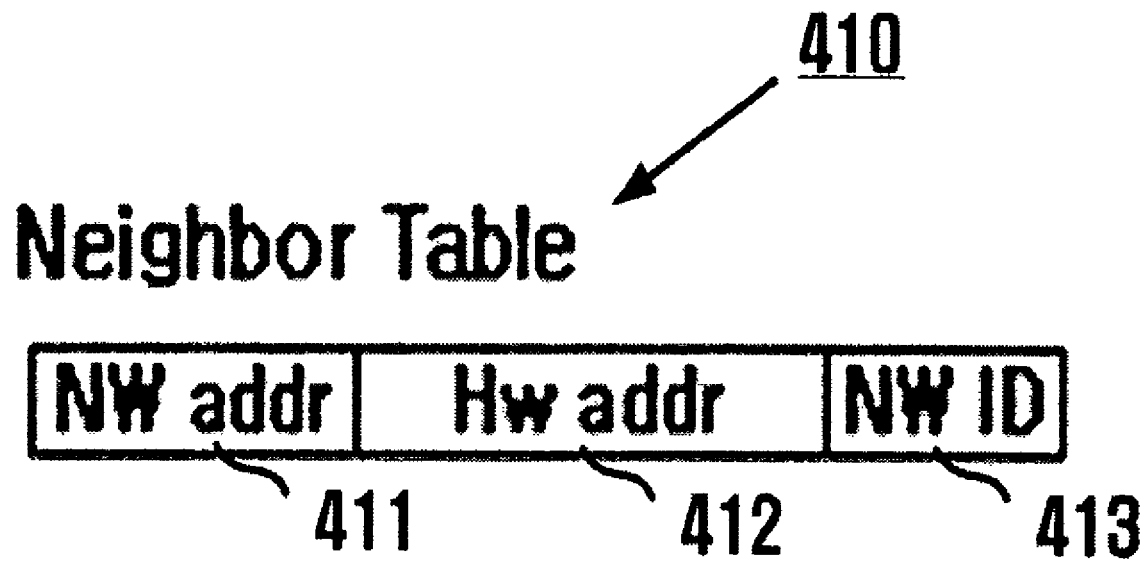
FIG. 4A is a view showing the structure of a Neighbor table.

First, FIG. 4A shows the structure of a Neighbor table 410 storing information on neighboring nodes of each node. Since nodes may be added or deleted randomly in an ad hoc network environment, information on a Network Address field (NW addr) 411 and a Hardware Address field (Hw addr) 412 of nodes in the Neighbor table is updated by transmitting/receiving hello messages among the nodes at a predetermined time interval. Here, the network address means a protocol address such as an IP address, and the hardware address means a unique identifier or physical address of hardware such as a MAC address. Finally, the Neighbor table 400 comprises a Network ID field (NW ID) 413, which informs that each node is included in which network and enables identification of each network.

Figure 4B:
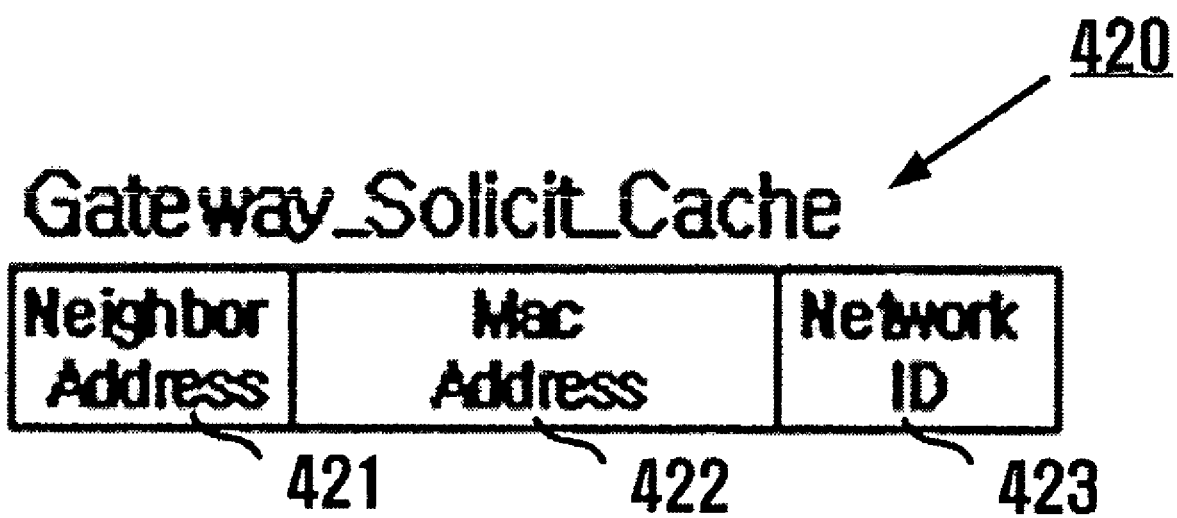
FIG. 4B is a view showing the structure of a Gateway_Solicit_Cache table.

FIG. 4B shows the structure of a Gateway_Solicit_Cache table 420, which is a table for storing information on a node that has transmitted Gateway Solicit Type1. The table 420 comprises a Neighbor Address field 421 in which a network address of the node that has transmitted Gateway Solicit Type1 is recorded, a MAC Address field 422 in which a MAC address of the node is recorded, and a Network ID field 423 in which a network ID of the node is recorded.

Figure 4C:
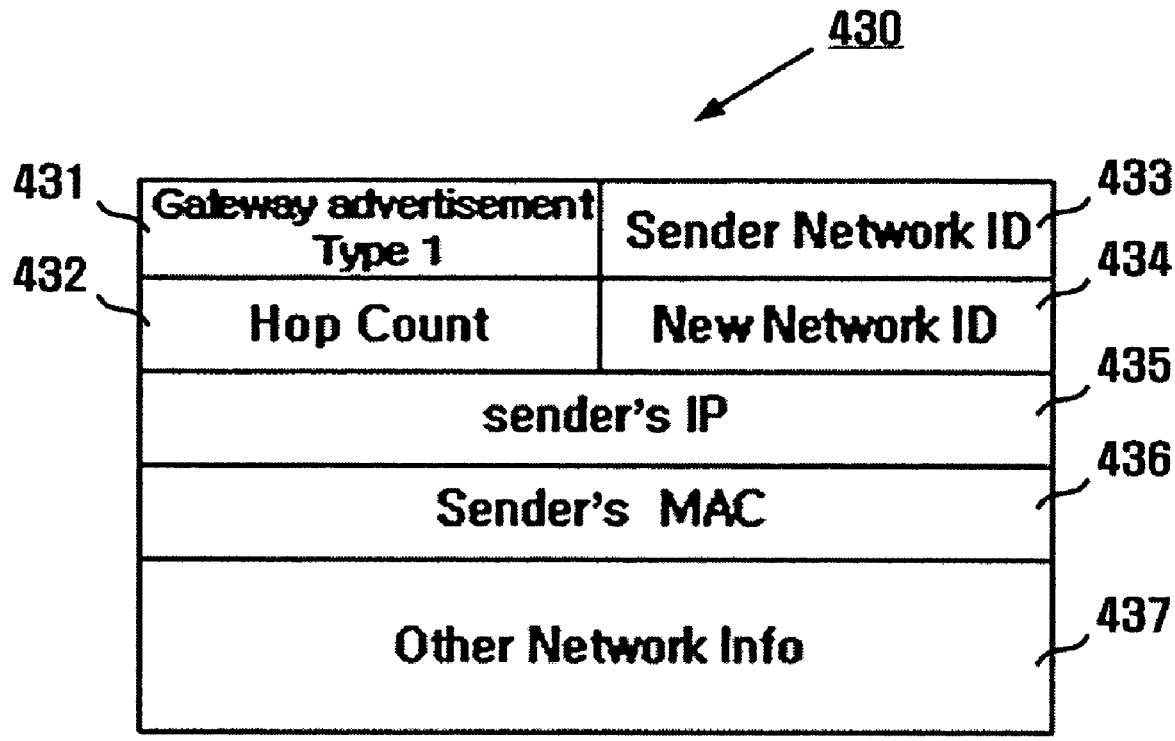
FIG. 4C is a view showing the structure of a Gateway Advertisement Type1 packet.

FIG. 4C shows the structure of a Gateway Advertisement Type1 packet 430 through which a sending node informs a receiving node of information on a gateway of a network to which the sending node belongs. The packet 430 includes a field 431 indicating that the packet is a Gateway Advertisement Type1 packet, a Hop Count field 432 indicating the number of hops to the gateway, a Sender Network ID field 433 in which a network ID of the sending node is recorded, a New Network ID field 434 in which a network ID of the receiving node is recorded, a Sender's IP field 435 in which a network address, i.e., an IP address, of the sending node is recorded, a Sender's MAC field 436 in which a hardware address, i.e., MAC address, of the sending node is recorded, and an Other Network Info field 437 in which information on a route to the gateway and other network information is recorded.

Figure 4D:
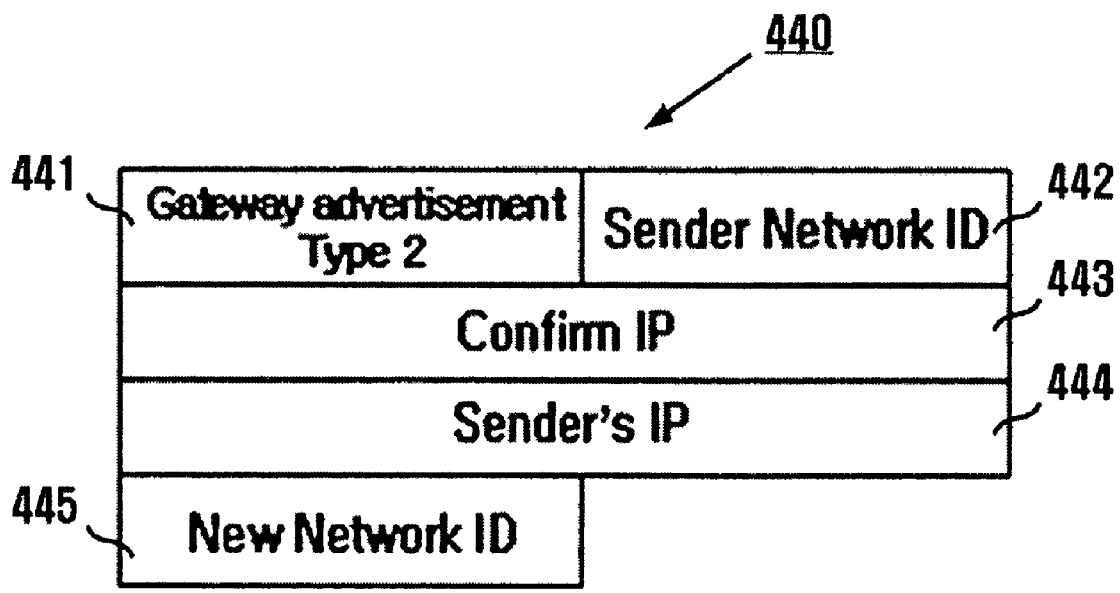
FIG. 4D is a view showing the structure of a Gateway Advertisement Type2 packet.

FIG. 4D shows the structure of a Gateway Advertisement Type2 packet 440 informing nodes present in the same network of an address allocated by a gateway. The packet 440 comprises a field 441 indicating that the packet is a Gateway Advertisement Type2 packet, a Sender Network ID field 442 in which a network ID of a sending node is recorded, a Confirm IP field 443 in which an IP address confirmed or newly allocated by the gateway is recorded, a Sender's IP field 444 in which an IP address of a node that has transmitted a Gateway Solicit Type1 packet to a network to which the gateway belongs is recoded, and a New Network ID field 445 in which an ID of the network to which the gateway belongs is recorded.

Figure 4E:
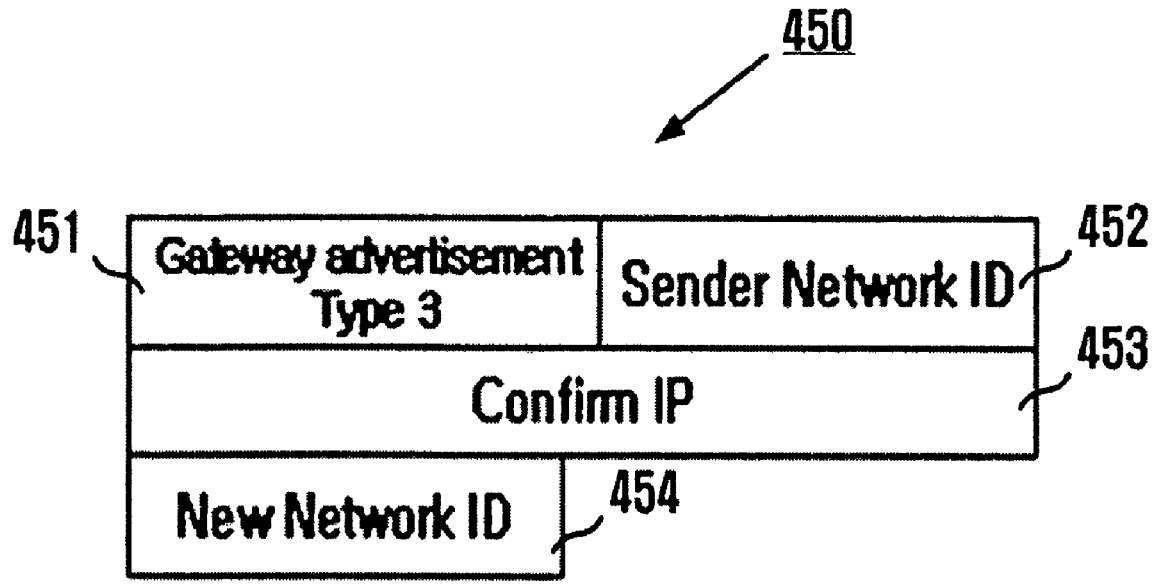
FIG. 4E is a view showing the structure of a Gateway Advertisement Type3 packet.

FIG. 4E shows the structure of a Gateway Advertisement Type3 packet 450 informing nodes present in different networks of an address allocated by a gateway. The packet 450 comprises all fields, except for only the Sender's IP field 444, in the Gateway Advertisement Type2 packet 440.

Figure 4F:
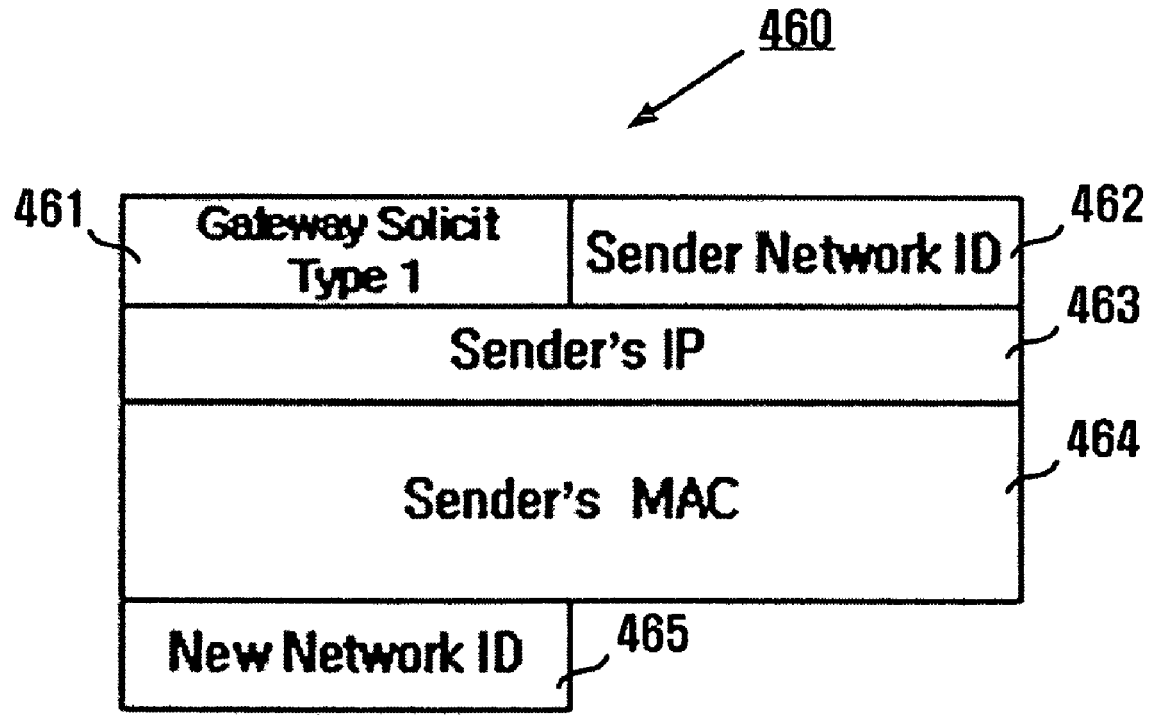
FIG. 4F is a view showing the structure of a Gateway Solicit Type1 packet.

FIG. 4F shows the structure of a Gateway Solicit Type1 packet 460 requesting a node present in a different network to transmit network configuration information. The packet 460 comprises a field 461 indicating that the packet is a Gateway Solicit Type1 packet, a Sender Network ID field 462 in which a network ID of a sending node is recorded, a Sender's IP field 463 in which an IP address of the sending node is recorded, a Sender's MAC field 464 in which a MAC address of the sending node is recorded, and a New Network ID field 465 in which an ID of a network to which a receiving node belongs is recorded.

Figure 4G:
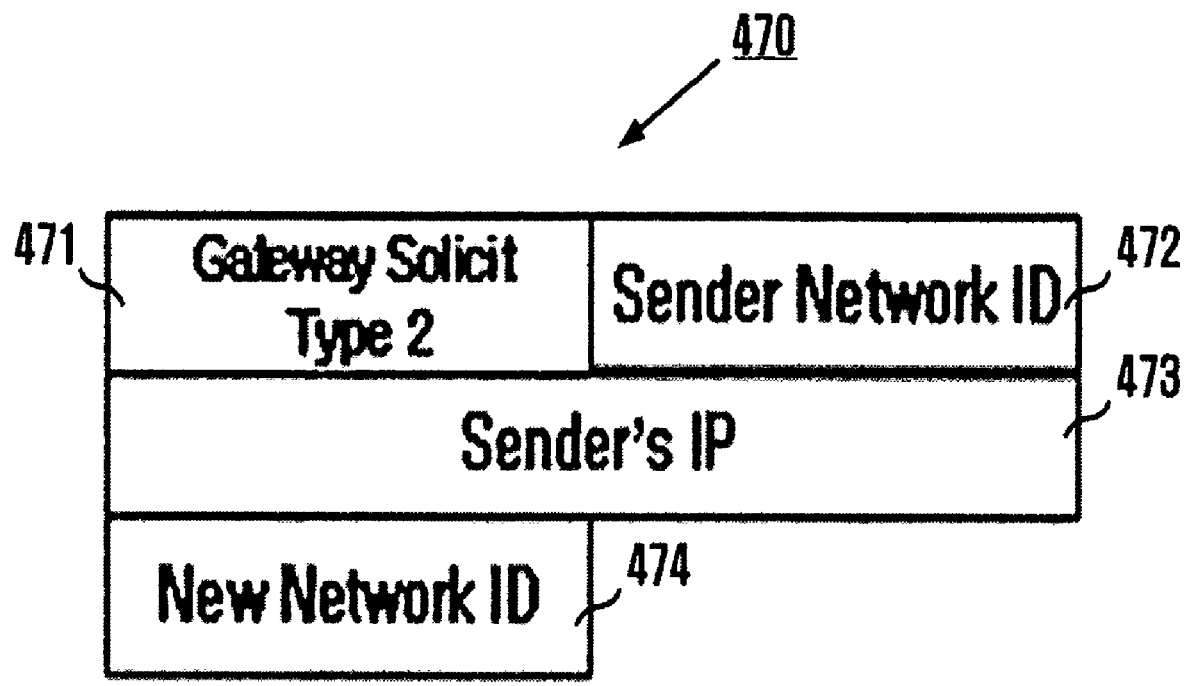
FIG. 4G is a view showing the structure of a Gateway Solicit Type2 packet.

FIG. 4G shows the structure of a Gateway Solicit Type2 packet 470 requesting a node present in the same network to transmit network configuration information. The packet 470 comprises all fields, except for only the Sender's MAC field 464, in the Gateway Solicit Type1 packet 460.

The Gateway Advertisement Type1 packet 430, the Gateway Advertisement Type3 packet 450 and the Gateway Solicit Type1 packet 460 are transmitted only to nodes with network IDs different from that of the node that transmits the packets. On the contrary, the Gateway Advertisement Type2 packet 440 and the Gateway Solicit Type2 packet 470 are transmitted only to nodes with the same network ID. In such a way, it is possible to prevent erroneous transmission of data to nodes with different network IDs and the same network address.

The operation of the present invention is performed through processes shown in FIGS. 5A to 10. Hereinafter, it is assumed that the node number of a node in question indicates the network address of the node. For example, it is assumed that a network address of node 1 is '1' and a network address of node 3 is '3.'

When node 1 201, node 3 203 and node 9 209 with the network ID of A has moved as shown in FIG. 3, the movement of the nodes is accomplished through the nodes of a network that have moved and neighbor nodes of another network adjacent thereto, i.e., through node 1 201 with the network ID of A, and node 3 303 and node 5 305 with the network ID of B.

Figure 5A:
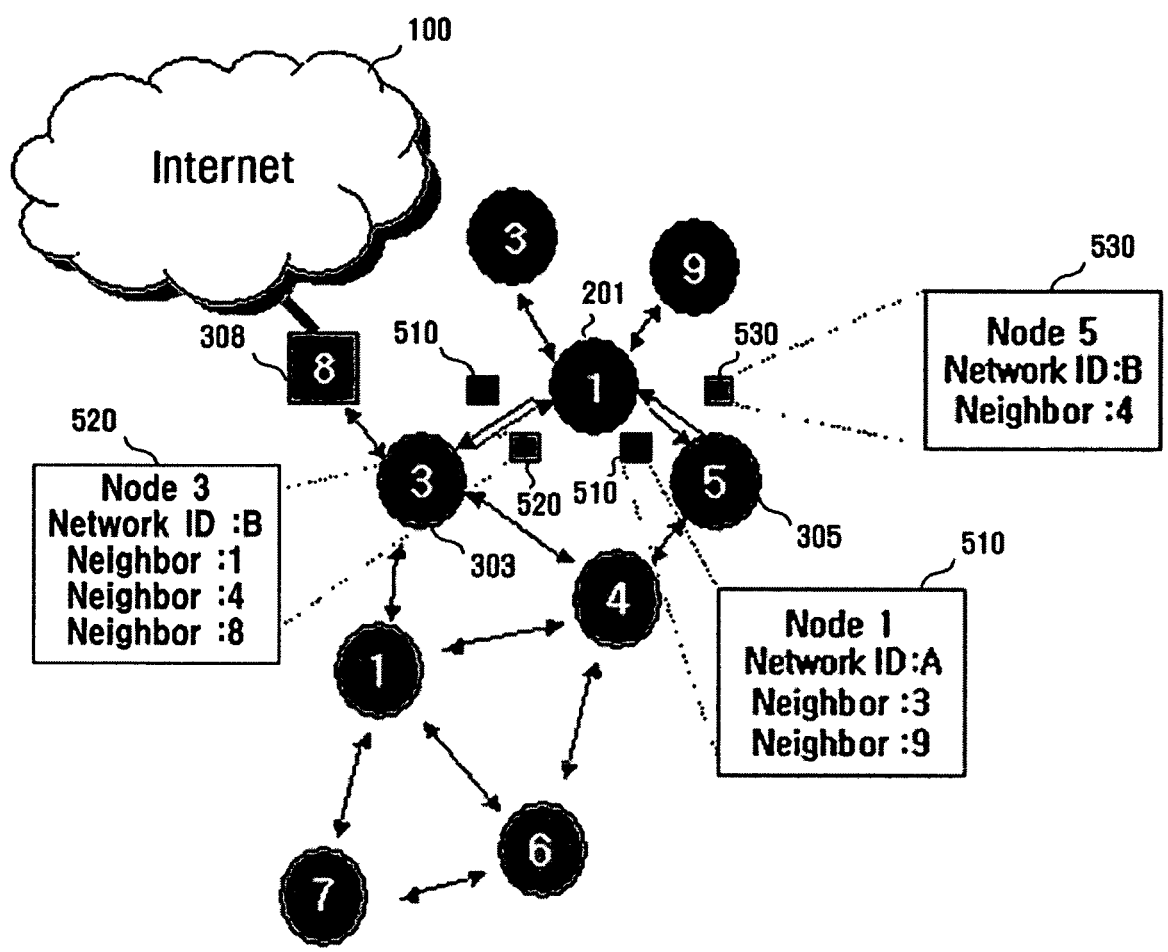
FIG. 5A is a view showing the transmission and reception of hello messages among neighbor nodes.

In the mobile ad hoc network environment, hello messages 510, 520 and 530 are periodically transmitted and received among the nodes, as shown in FIG. 5A, in order to detect the presence of neighboring nodes. At this time, the network ID identified by an access point and used by each node is included in the hello information and then transmitted. As a result of transmission and reception of the hello messages, each node reflects the contents of the hello messages on and updates its own Neighbor table.

Figure 5B:
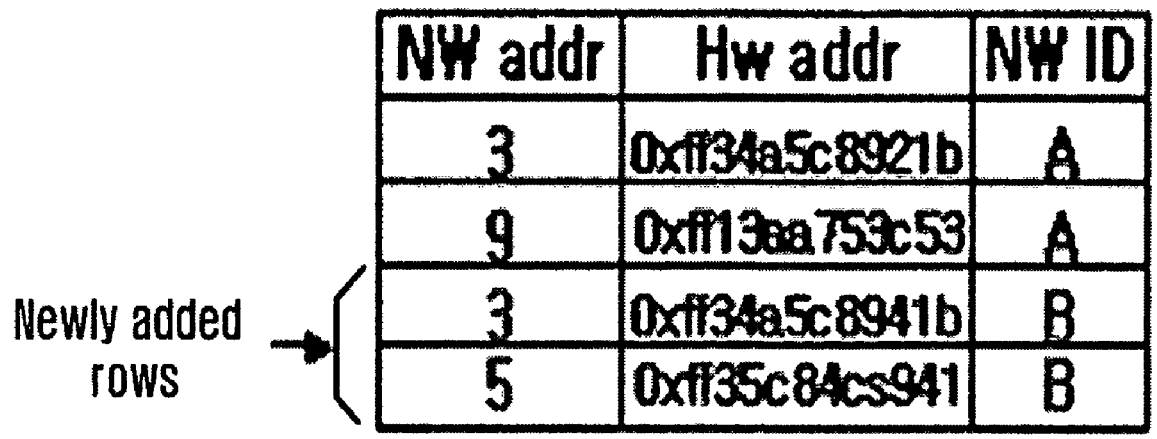
FIG. 5B is a view showing the contents of a Neighbor table of node 1 that are updated through the hello messages in FIG. 5A.
Figure 5C:
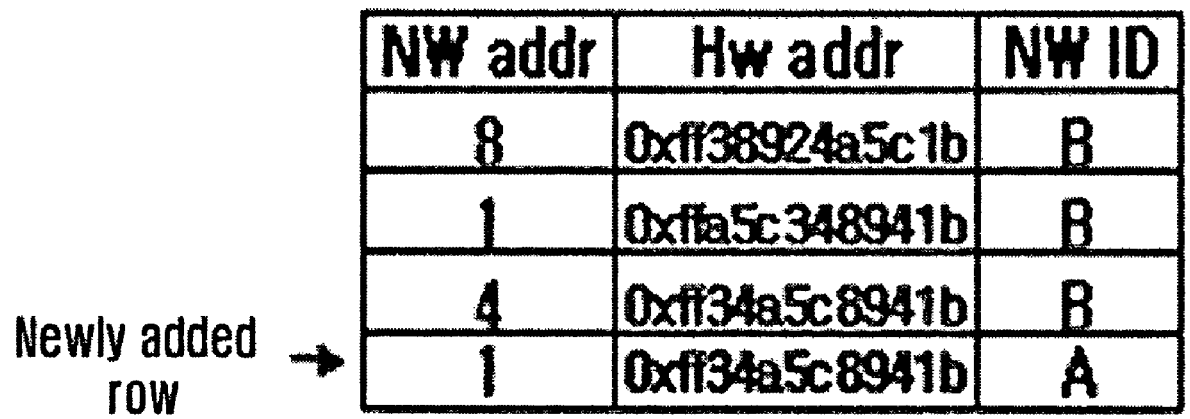
FIG. 5C is a view showing the contents of a Neighbor table of node 3 that are updated through the hello messages in FIG. 5A.

FIG. 5B shows an updated Neighbor table of node 1 201, wherein two rows including network addresses, hardware addresses and network IDs of node 3 303 and node 5 305 with the network ID of B are added to existing information on neighbor nodes. In addition, FIG. 5C shows an updated Neighbor table of node 3 303, wherein one row including a network address, a hardware address and a network ID of node 1 201 with the network ID of A is added to existing information on neighbor nodes. Further, FIG. 5D shows an updated Neighbor table of node 5 305, wherein the same row as added in FIG. 5C is added to existing information on neighbor nodes.

When nodes with different network IDs are added to the Neighbor tables in such a manner, it can be determined that nodes which have received the hello messages have moved or nodes with different network IDs have moved. In the present invention, it is determined that nodes with different network IDs have moved. In other words, node 1 201 determines that node 3 303 and node 5 305 have moved and approached node 1, and node 3 303 and node 5 305 determine that node 1 201 has moved and approached node 3 and node 5.

Figure 6:
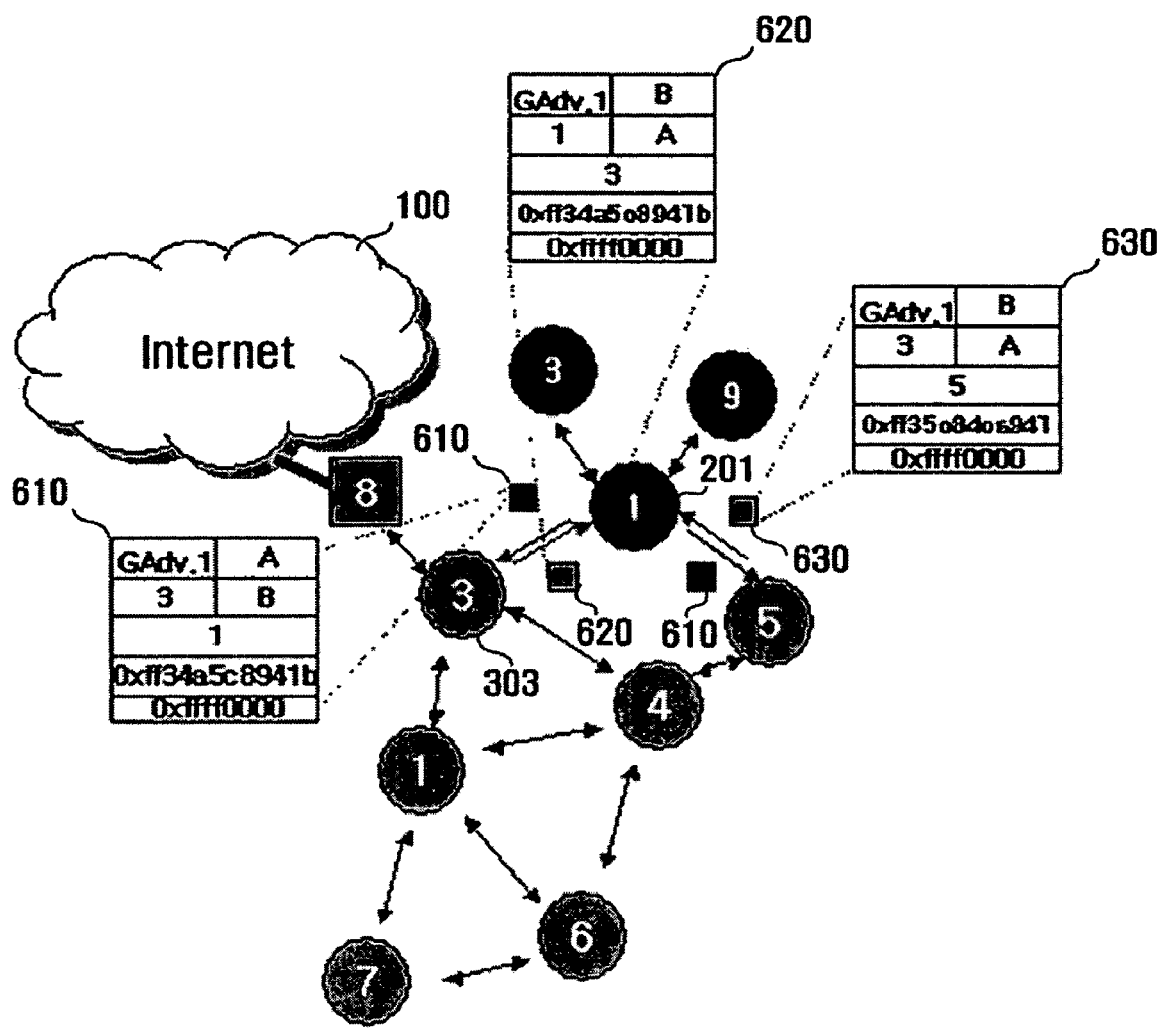
FIG. 6 is a view showing the process of transferring a Gateway Advertisement Type1 packet.

As shown in FIG. 6, node 1 201, node 3 303 and node 5 305 transmit their own information on an access point, i.e., a gateway, to nodes with different network IDs through a Gateway Advertisement Type1 packet. In other words, node 1 201 with the network ID of A transmits a Gateway Advertisement Type1 packet 610 including information on the gateway of the network A to node 3 303 and node 5 305 with the network ID of B. Specifically, node 1 201 informs node 3 303 and node 5 305 that a hop count (432 in FIG. 4C) to the gateway is '3,' a network ID (433 in FIG. 4C) of the sending node is 'A,' a new network ID (434 in FIG. 4C) is 'B,' an IP address (435 in FIG. 4C) of the sending node is '1,' and a MAC address (436 in FIG. 4C) of the sending node is '0xff34a5c8941b.'

Similarly, node 3 303 informs node 1 201 that a hop count (432 in FIG. 4C) to the gateway is '1,' a network ID (433 in FIG. 4C) of the sending node is 'B,' a new network ID (434 in FIG. 4C) is 'A,' an IP address (435 in FIG. 4C) of the sending node is '3,' and a MAC address (436 in FIG. 4C) of the sending node is '0xff34a508941b.'

Further, node 5 305 informs node 1 201 that the hop count (432 in FIG. 4C) to the gateway is '3,' a network ID (433 in FIG. 4C) of the sending node is 'B,' the new network ID (434 in FIG. 4C) is 'A,' the IP address (435 in FIG. 4C) of the sending node is '5,' and the MAC address (436 in FIG. 4C) of the sending node is '0xff3508405941.'

At this time, the Gateway Advertisement Type1 packet is transmitted to only nodes with different network IDs within only one hop. Each of the nodes that have received the Gateway Advertisement Type1 packet selects a node with a minimum hop count (432 in FIG. 4C) by referring to hop information contained in the Gateway Advertisement Type1 packet and transmits the Gateway Solicit Type1 packet (460 in FIG. 4F) to the selected node. That is, node 1 210 with the network ID of A transmits a Gateway Solicit Type1 packet 710 including a network address to be used by node 1, i.e., the Sender's IP field (463 in FIG. 4F), to only node 3 303 closer to the gateway of the network B. Further, since node 3 303 and node 5 305 with the network ID of B have received the Gateway Advertisement Type1 packet from only node 1 201, they transmit the Gateway Solicit Type1 packets 710 and 730 including network addresses to be used by nodes 3 and 5, i.e., the Sender's IP fields (463 in FIG. 4F), to node 1 201, respectively. The Gateway Solicit Type1 packets are also transmitted to only nodes with different network IDs within only one hop.

Each of the nodes that have received the relevant Gateway Solicit Type1 packet stores the packet in its own Gateway_Solicit_Cache table (420 in FIG. 4B). FIG. 7B shows information stored in a Gateway_Solicit_Cache table of node 3 303, and FIG. 7C shows information stored in a Gateway_Solicit_Cache table of node 1 201.

Figure 8:
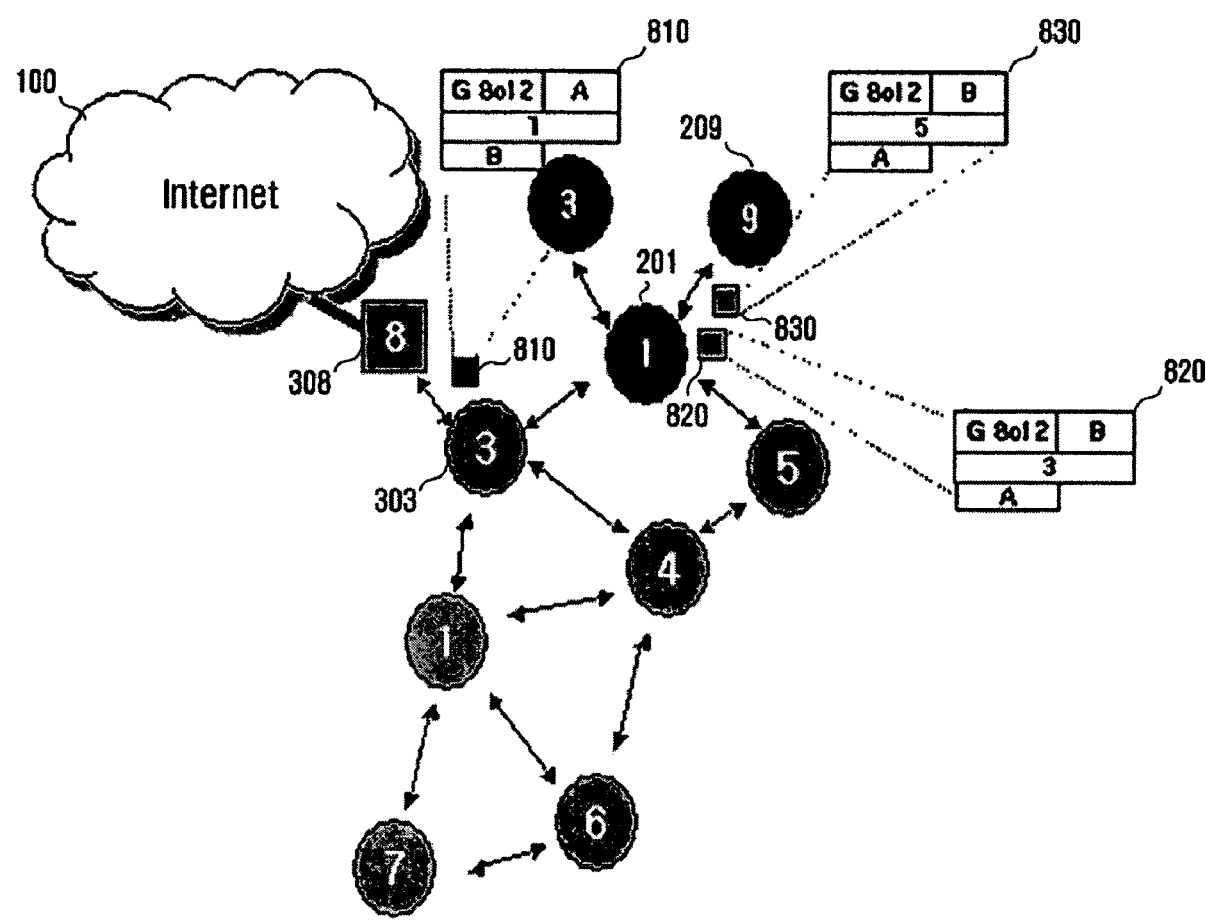
FIG. 8 is a view showing the process of transferring a Gateway Solicit Type2 packet to a gateway.
Figure 9:
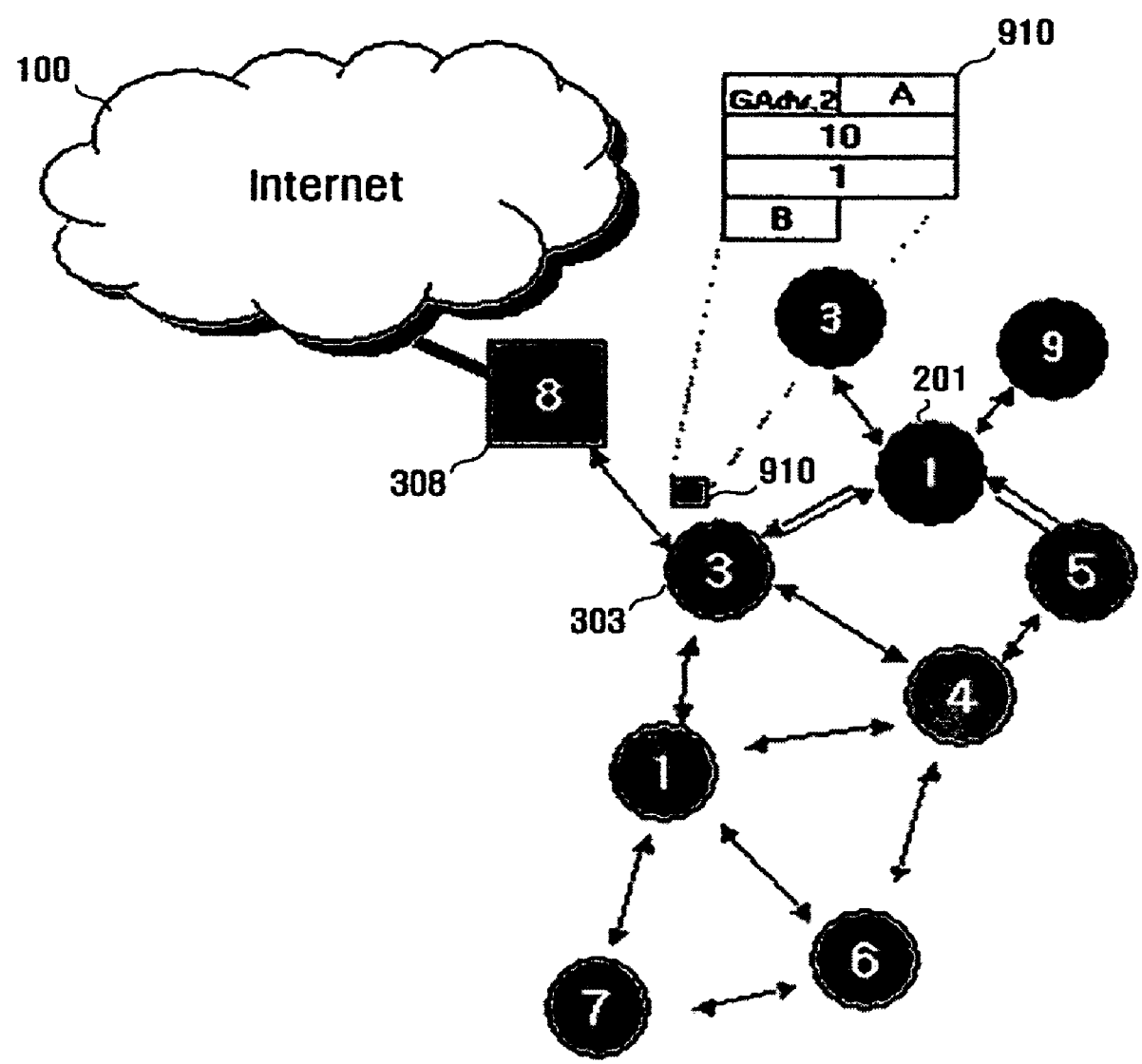
FIG. 9 is a view showing the process of transferring a Gateway Advertisement Type2 packet.

Then, as shown in FIG. 8, each of the nodes that have received the relevant Gateway Solicit Type1 packet configures the Gateway Solicit Type2 packet (470 in FIG. 4G) using information stored in its own Gateway_Solicit_Cache table and transmits the packet to the gateway using its own routing information. The Gateway Solicit Type2 packets (470 in FIG. 4G) are transmitted to only nodes with the same network ID through multi-hops.

At this time, node 1 201 that has received the Gateway Solicit Type1 packets (720 and 730 in FIG. 7A) transmitted by node 3 303 and node 5 305 intends to transmit Gateway Solicit Type2 packets to its own gateway using its own routing information. Since the packets should pass through node 9 209 to be transmitted to the gateway using the routing information, node 1 201 transmits the Gateway Solicit Type2 packets 820 and 830 for node 3 303 and node 5 305 to node 9 209. However, since the network A has no gateway, node 1 201 cannot receive any response thereto from node 9 209. Accordingly, the contents (see FIG. 7C) recorded in the Gateway_Solicit_Cache table of node 1 201 that has not received any response are deleted due to time-out. On the other hand, since there is a gateway in the network B, node 3 303 that has received the Gateway Solicit Type1 packet (710 in FIG. 7A) transmitted by node 1 201 transmits a Gateway Solicit Type2 packet 810 to node 8 308 that is a gateway of node 3 303.

As described above, when nodes present in different networks approach each other, one party determines that the other party has approached the one party and performs the aforementioned processes. However, it is eventually determined that node 1 201 in which the contents recorded in the Gateway_Solicit_Cache table of node 1 201 have been deleted has approached the network B.

Figure 7A:
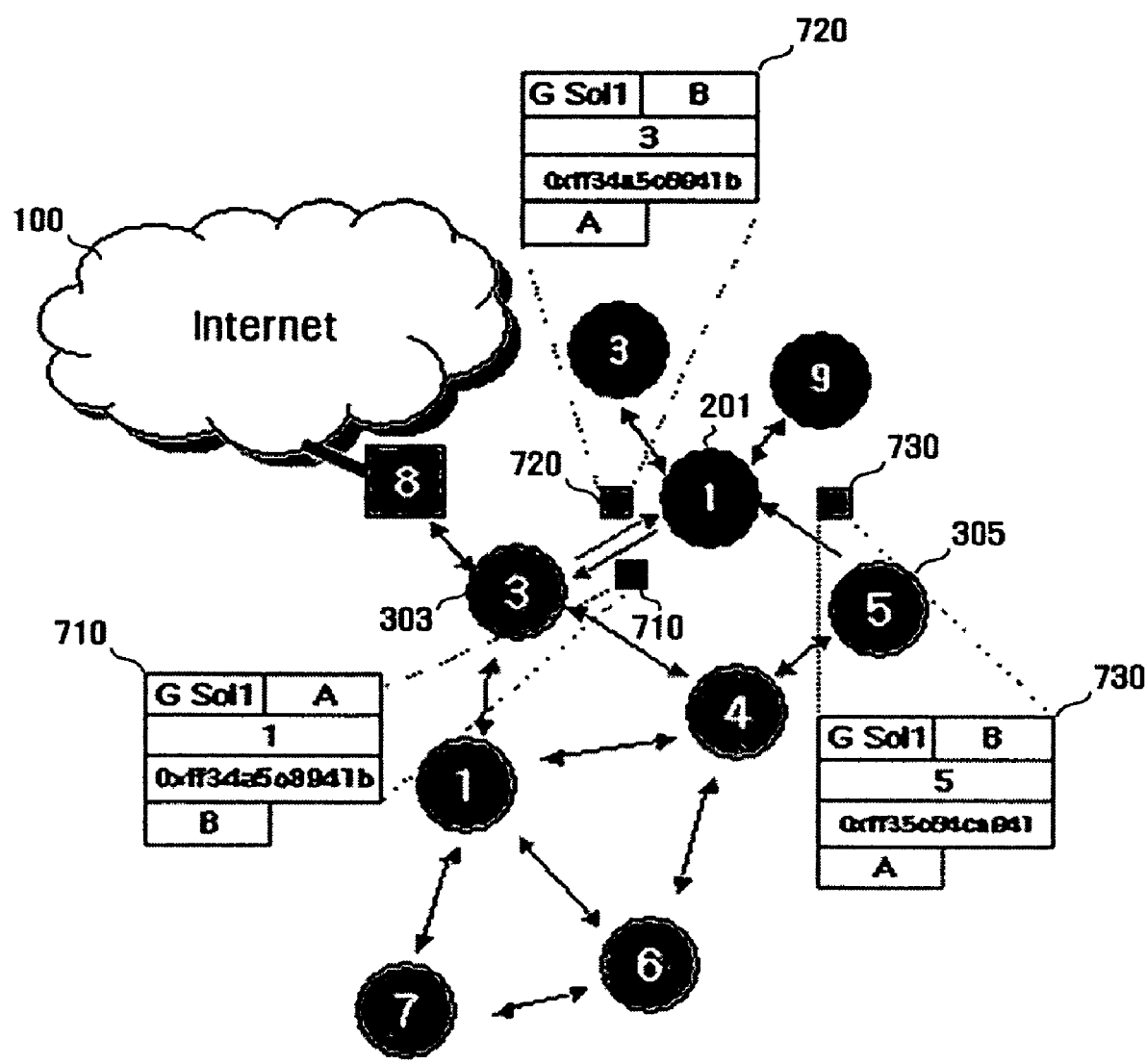
FIG. 7A is a view showing the process of transferring a Gateway Solicit Type1 packet.

The gateway 308 that has received the Gateway Solicit Type2 packet 810 from node 3 303 confirms whether it can use an address to be used by node 1 201, i.e., the address of '1' in the Sender's IP field of the Gateway Solicit Type1 packet (710 in FIG. 7A). If a conflict occurs due to the presence of the same address in the network B, the gateway allocates a different address that is not present in the network B. In this example, since there exists a node 301 with the same address in the network B, the gateway allocates a new address of '10' to node 301.

The gateway informs node 3 303 of the allocation of the new address of '10' by transmitting the Gateway Advertisement Type2 packet (440 in FIG. 4D) thereto. This packet is finally transmitted to a neighbor node, i.e., node 3 303, with a network ID different from that of the nodes that have moved, as shown FIG. 9.

Figure 10:
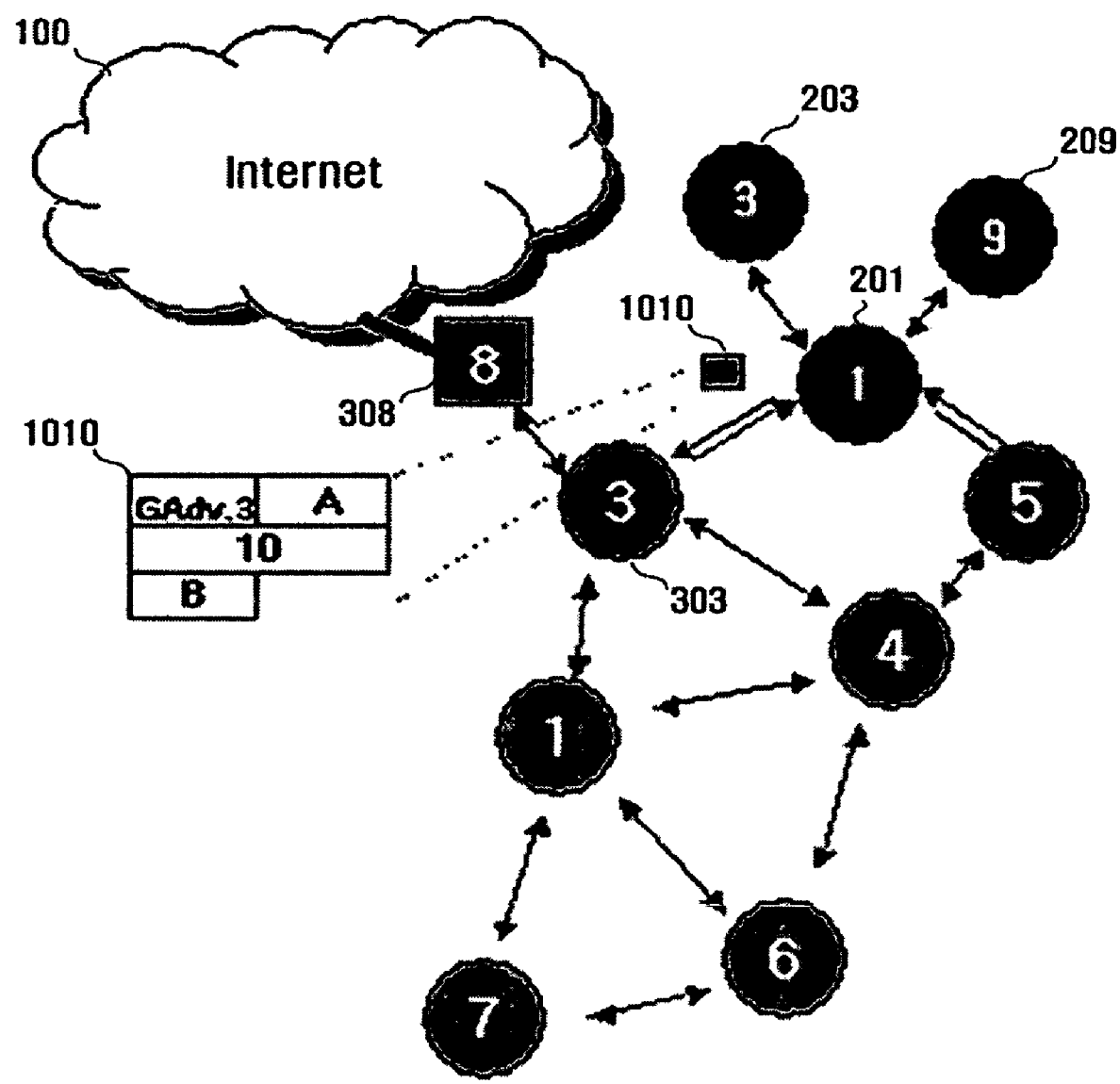
FIG. 10 is a view showing the process of transferring a Gateway Advertisement Type3 packet.

Then, as shown in FIG. 10, node 3 303 transmits the Gateway Advertisement Type3 packet (450 in FIG. 4E), including the available network address of '10' allocated by the gateway 308, to node 1 201 by using the information (see FIG. 7B) of the Gateway_Solicit_Cache table of node 3 303. Node 1 201 that has received the Gateway Advertisement Type3 packet changes its own network information using the information of the Gateway Advertisement Type1 packet (620 in FIG. 6) received in advance and information of a Gateway Advertisement Type3 packet 1010, and secures a route to the gateway 308 of the network B. Consequently, node 1 201 changes its own network ID to 'B' and its own network address to '10' and finds the route to the gateway 308 by referring to the contents of the Other Network Info field (437 in FIG. 4C) of the Gateway Advertisement Type1 packet (620 in FIG. 6). Accordingly, node 1 201 becomes a member of the network B. Next, node 1 201 serves as an arbiter of node 3 203 and node 9 209 with respect to the network B in the same manner as node 3 303 which has performed the processes for node 1 201, so that node 3 203 and node 9 209 can also become members of the network B through the same processes.

Figure 11:
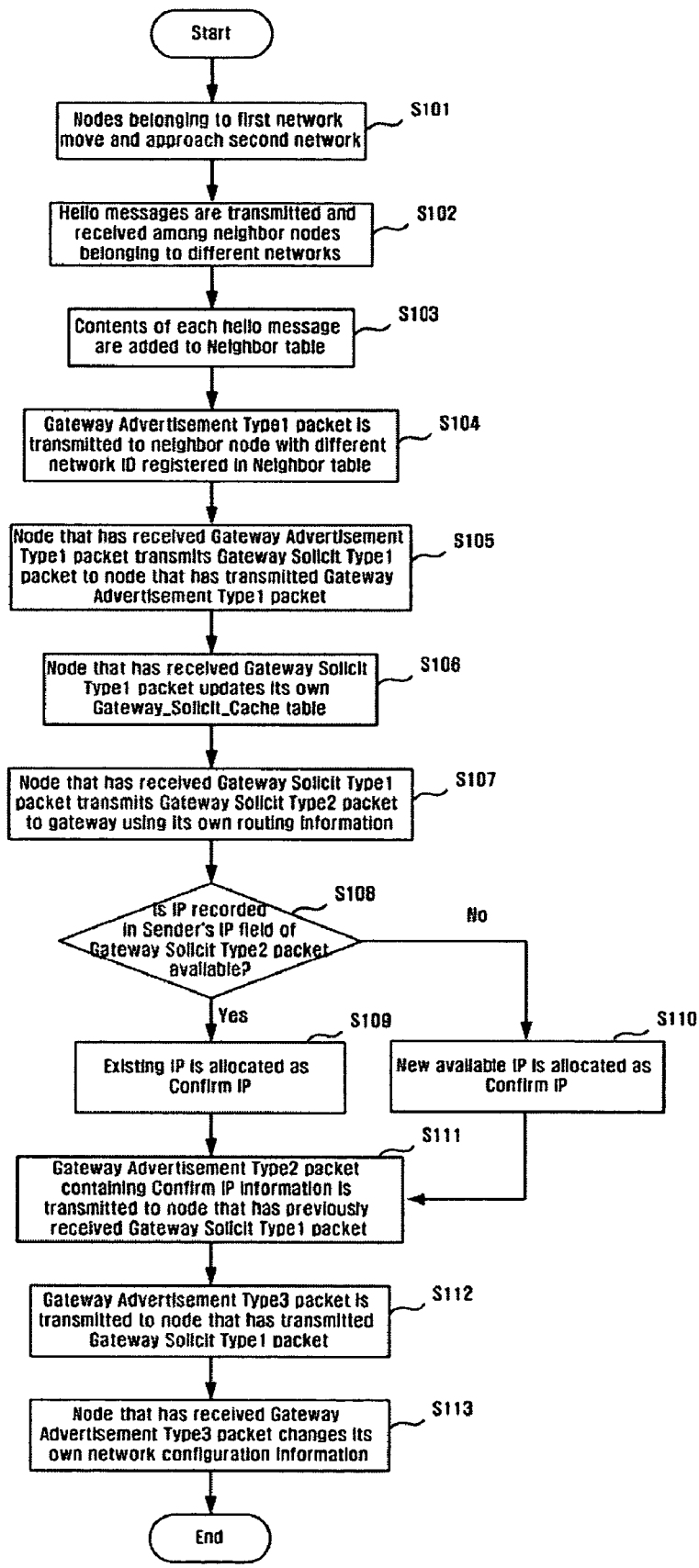
FIG. 11 is a flowchart illustrating entire processes for the operation of the present invention.

FIG. 11 is a flowchart illustrating entire processes for the operation of the present invention.

First, steps S101 to S103 correspond to the process of detecting movement of new mobile nodes when the new mobile nodes move into and participate in a mobile multi-hop network.

Mobile nodes with a first network ID move and approach a second network with a second network ID (S101). That is, more than one of the approaching nodes enter the second network to be within one hop from more than one of nodes belonging to the second network. Next, hello messages are transmitted and received among the nodes that belong to the different respective networks and connected to one another through one hop (S102). Each hello message includes information on the network ID, network address and hardware address of the sending node. Accordingly, if it is confirmed that the network ID included in each hello message is different from that of the network to which a node in question belongs, it is possible to detect that the sending node, which has transmitted the hello message, has moved.

The nodes that have received the hello messages each of which includes the network ID, the network address and the hardware address of the sending node add the contents of the hello messages to their own Neighbor tables (S 103).

Second, steps S104 to S107 correspond to the process by which the mobile nodes that have moved into and participated in the second network secure routes to a gateway and request network configuration information.

As in step S103, when information on a node with a different network ID is added to a Neighbor table of a node in question, the node that has received the information determines that the sending node approaches the network of the receiving node from the previous network of the sending node, and then transmits the Gateway Advertisement Type1 packet to the sending node (S 104).

The node that has received the Gateway Advertisement Type1 packet transmits the Gateway Solicit Type1 packet to the node that has transmitted the Gateway Advertisement Type1 packet in order to request network configuration information (e.g., IP address and gateway route information) of the network to which the node that has transmitted the Gateway Advertisement Type1 packet belongs (S105). If there are a plurality of nodes that have transmitted Gateway Advertisement Type1 packets, the Gateway Solicit Type1 packet is transmitted to only a node with a small hop count (432) in the Gateway Advertisement Type1 packet.

Then, the node that has received the Gateway Solicit Type1 packet updates its own Gateway_Solicit_Cache table using the information transmitted through the Gateway Solicit Type1 packet (S 106).

Subsequently, the node that has received the Gateway Solicit Type1 packet transmits the Gateway Solicit Type2 packet to the gateway using its own routing information (S107). If the Gateway Solicit Type2 packet has to go through more than two hops to the gateway, it reaches the gateway via intermediate nodes.

Finally, steps following step S108 correspond to a process by which the new mobile node that has moved into and participated in the new network is allocated an available network address and changes its own network configuration information.

The gateway that has received the Gateway Solicit Type2 packet determines whether an IP address recorded in the Sender's IP field of the Gateway Solicit Type2 packet is available in the network to which the gateway belongs (S108). If the same IP address is not present in address data of the gateway, the IP address recorded in the Sender's IP field is allocated to the new mobile node (S109). If the same IP address is present in the address data of the gateway, a new different IP address is allocated to the mobile node (S110).

A Gateway Advertisement Type2 packet including the allocated IP address (Confirm IP) is transmitted to the node that has previously received the Gateway Solicit Type1 packet (S111). Even in this case, if the Gateway Advertisement Type2 packet has to go through more than two hops from the gateway to the node that has previously received the Gateway Solicit Type1 packet, the Gateway Advertisement Type2 packet reaches the node via intermediate nodes.

Thereafter, the node that has finally received the Gateway Advertisement Type2 packet transmits a Gateway Advertisement Type3 packet to the node that has transmitted the Gateway Solicit Type1 packet (S112). Then, the node that has received the Gateway Advertisement Type3 packet becomes a member of the new network by changing its own network configuration information such as an IP address and a route to the gateway (S113).

However, there may be a case where even though a node transmits a Gateway Solicit Type2 packet to a gateway of a network to which the node belongs as in step S107, it does not receive any response from the gateway. This case means that although the node has information on the gateway of the network to which the node was connected previously, there is no gateway connected to the network to which the node belongs at present. Accordingly, this case can be considered as corresponding to a case where the network to which the node belongs has moved.

According to the present invention described above, it is possible to quickly perform a process by which multi-hop based mobile nodes detect their movement using their network IDs and secure information on an access point or gateway in a new network.

In addition, according to the present invention, it is also possible to reduce network overhead that is produced while multi-hop based mobile nodes obtain network addresses and network configuration information and are then connected with the Internet.

Furthermore, according to the present invention, it is possible to automatically perform a process by which network addresses of multi-hop based mobile nodes are confirmed by access points and the mobile nodes are actually connected with the Internet using the confirmed network addresses.

Although the present invention has been described in connection with the exemplary embodiments of the present invention, it can be understood by those skilled in the art that various modifications and changes may be made thereto without departing from the scope and spirit of the invention. Therefore, it should be understood that the above embodiments are not limitative, but merely illustrative in all aspects. The scope of the present invention is defined by the appended claims rather than the detailed description. All modifications and changes derived from the scope and spirit of the claims and equivalents thereof should be construed as falling within the scope of the present invention.

What is claimed is:

1. A method for automatically configuring a network address of a first mobile node newly participating in a mobile multi-hop network implemented by the first mobile node, the method, comprising:
   (a) if the first mobile node belonging to a first network moves into and participates in a second network, detecting that the first mobile node has moved through transmission and reception of hello messages between the first mobile node and a second mobile node that belongs to the second network;
   (b) securing a route from the first mobile node to a gateway of the second network and requesting network configuration information of the second network; and
   (c) receiving an available network address allocated by the gateway and changing network configuration information of the first mobile node;
   wherein (b) comprises:
   receiving a first packet including information on the gateway of the second network from the second mobile node, wherein the information on the gateway includes a hop count to the gateway of the second network from the second mobile node; and
   transmitting a second packet requesting the network configuration information of the second network to the second mobile node having the smallest hop count.

2. The method as claimed in claim 1, wherein each of the hello messages includes a network ID, a network address and hardware information of a respective sending node.

3. The method as claimed in claim 1, wherein (b) further comprises:
   receiving a third packet requesting network configuration information of the second network to the gateway, using information of the second packet and routing information.

4. The method as claimed in claim 3, wherein the first packet includes:
   information on a hop count to the gateway;
   information on an ID of the second network to which the second node transmitting the first packet belongs;
   information on an ID of the first network to which the first mobile node receiving the first packet belongs;
   information on an IP address of the second node transmitting the first packet; and
   information on a MAC address of the second node transmitting the first packet.

5. The method as claimed in claim 3, wherein the second packet includes:
   information on an ID of the first network to which the first mobile node transmitting the second packet belongs;
   information on an IP address of the first mobile node transmitting the second packet;
   information on a MAC address of the first mobile node transmitting the second packet; and
   information on an ID of the second network to which the second node receiving the second packet belongs.

6. The method as claimed in claim 3, wherein the third packet includes:
   information on an ID of the first network to which the first mobile node transmitting the second packet belongs;
   information on an IP address of the first mobile node transmitting the second packet; and
   information on an ID of the second network to which the second node receiving the second packet belongs.

7. The method as claimed in claim 1, wherein (c) comprises:
   determining, based on address data of the gateway, whether a network address used by the first mobile node is available;
   allocating the network address as an allocated network address if it is determined that the network address is available, or allocating a new available network address as the allocated network address if it is determined that the network address is not available;
   transmitting information on the allocated network address to the first mobile node; and
   changing the network configuration information of the first mobile node.

8. The method as claimed in claim 7, wherein the operation of determining whether the network address is available is made based on whether the network address is used in the address data of the gateway.

9. The method as claimed in claim 7, wherein the network configuration information of the first mobile node includes information on a route to the gateway and information on an IP address.

10. The method as claimed in claim 7, wherein the operation of transmitting the information on the allocated network address to the first mobile node comprises:
    transmitting a fourth packet including the information on the allocated network address to a second mobile node neighboring the first mobile node; and
    transmitting a fifth packet to the first mobile node, using the fourth packet.

11. The method as claimed in claim 10, wherein the fourth packet includes:
    information on a network ID of the first network to which the first mobile node belongs;
    information on an IP address allocated by the gateway;
    information an IP address of the first mobile node; and
    information on a network ID of the second network to which the second mobile node belongs.

12. The method as claimed in claim 10, wherein the fifth packet includes:
    information on a network ID of the first network to which the first mobile node belongs;
    information on an IP address allocated by the gateway;
    information on a network ID of the second network to which the second mobile node belongs.

13. A first mobile node newly participating in a mobile multi-hop network and receiving an allocated network address, comprising:
    a detector operable to detect that the first mobile node has moved through transmission and reception of hello messages between the first mobile node and a second mobile node that belongs to a second network, when the first mobile node belonging to a first network moves into and participates in the second network;
    a second means for securing a route from the first mobile node to a gateway of the second network and requesting network configuration information of the second network; and a third means for receiving an available network address allocated by the gateway and changing network configuration information of the first mobile node;

wherein the request for the network configuration information is made by receiving a first packet including information on the gateway of the second network from the second mobile node, wherein the information on the gateway includes a hop count to the gateway of the second network from the second mobile node, and transmitting a second packet requesting the network configuration information of the second network to the second mobile node having the smallest hop count.

14. The mobile node as claimed in claim 13, wherein each of the hello messages includes a network ID, a network address and hardware information of a respective sending node.

15. The mobile node as claimed in claim 13, wherein, if there are more than two nodes transmitting respective first packets, the second packet is transmitted only to one of the more than two nodes with a small hop count to the gateway from information of the first packets.

16. The mobile node as claimed in claim 13, wherein the first packet includes:
information on a hop count to the gateway;
information on an ID of the second network to which the second node transmitting the first packet belongs;
information on an ID of the first network to which the first mobile node receiving the first packet belongs;
information on an IP address of the second node transmitting the first packet; and
information on a MAC address of the second node transmitting the first packet.

17. The mobile node as claimed in claim 13, wherein the second packet includes:
information on an ID of the first network to which the first mobile node transmitting the second packet belongs;
information on an IP address of the first mobile node transmitting the second packet;
information on a MAC address of the first mobile node transmitting the second packet; and
information on an ID of the second network to which the second node receiving the second packet belongs.

18. The mobile node as claimed in claim 13, wherein the available network address is not used in address data of the gateway.

19. The mobile node as claimed in claim 13, wherein the network configuration information of the first mobile node includes information on a route to the gateway and information on an IP address.

* * * * *